United States Patent
Storm

(10) Patent No.: US 7,296,145 B1
(45) Date of Patent: Nov. 13, 2007

(54) METHOD OF SECURE COMMUNICATION OVER A DISTRIBUTED NETWORK WITHOUT USING SECURE SOCKET LAYER

(75) Inventor: Kim F. Storm, Copenhagen (DK)

(73) Assignee: F5 Networks, Inc., Seattle, WA (US)

( * ) Notice: Subject to any disclaimer, the term of this patent is extended or adjusted under 35 U.S.C. 154(b) by 827 days.

(21) Appl. No.: 09/853,743

(22) Filed: May 10, 2001

(51) Int. Cl.
*H04L 9/00* (2006.01)

(52) U.S. Cl. .............. 713/150; 715/540; 715/508; 715/760

(58) Field of Classification Search ........ 713/200–202, 713/189, 176, 187, 150; 715/540, 700, 760, 715/505–508, 513, 516–523
See application file for complete search history.

(56) References Cited

U.S. PATENT DOCUMENTS

| | | | | |
|---|---|---|---|---|
| 5,987,440 | A * | 11/1999 | O'Neil et al. ............... 705/44 |
| 6,161,139 | A * | 12/2000 | Win et al. .................. 709/225 |
| 6,397,253 | B1 * | 5/2002 | Quinlan et al. ............. 709/227 |
| 6,490,601 | B1 * | 12/2002 | Markus et al. .............. 715/507 |
| 6,751,736 | B1 * | 6/2004 | Bowman et al. ............ 713/189 |
| 6,957,334 | B1 * | 10/2005 | Goldstein et al. ........... 713/170 |
| 6,980,970 | B2 * | 12/2005 | Krueger et al. .............. 705/39 |
| 2001/0054155 | A1 * | 12/2001 | Hagan et al. ............... 713/193 |
| 2002/0062342 | A1 * | 5/2002 | Sidles ....................... 709/203 |
| 2003/0053420 | A1 * | 3/2003 | Duckett et al. ............. 370/252 |

\* cited by examiner

*Primary Examiner*—Emmanuel L. Moise
*Assistant Examiner*—Tamara Teslovich
(74) *Attorney, Agent, or Firm*—Darby & Darby PC; Jamie L. Wiegand

(57) ABSTRACT

A system and method for conducting secure distributed network communications without using Secure Socket Layer. A frame having an embedded security applet is forwarded by the device to an external node on the network. The security applet prompts a user at the external node for login data. Once valid, login data is established, subsequent frames sent between the device and external node includes a blank form with an appended string of tagged and concatenated secure field values encrypted using a key derived from the login data.

24 Claims, 3 Drawing Sheets

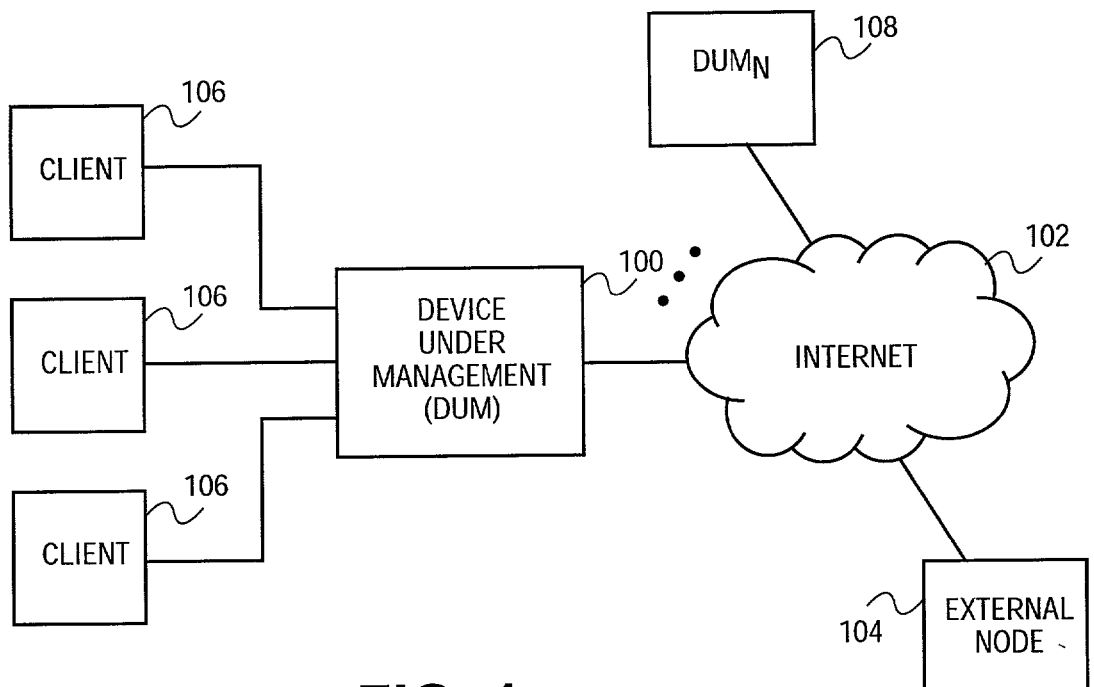
FIG. 1
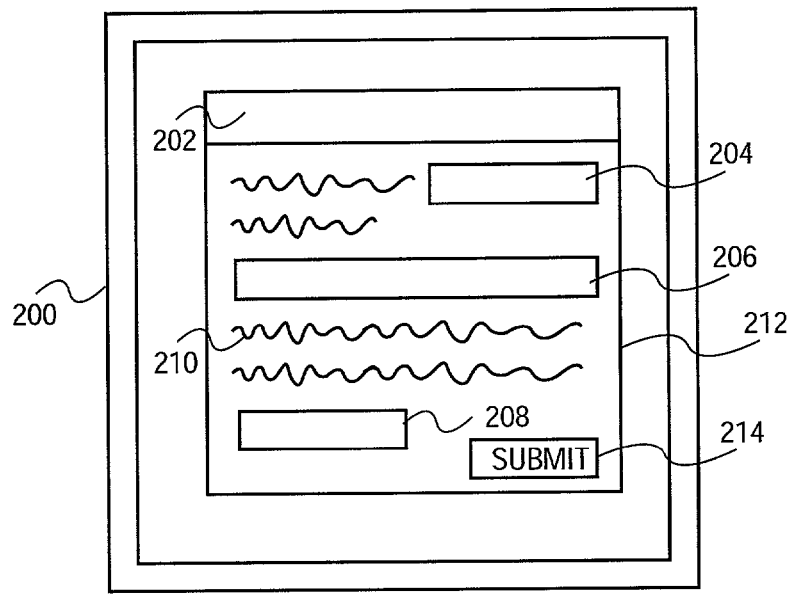
FIG. 2a
INT 4 BYTE 204' CHAR 64 BYTE 206' BOOL 1 BYTE 208'
FIG. 2b

METHOD OF SECURE COMMUNICATION OVER A DISTRIBUTED NETWORK WITHOUT USING SECURE SOCKET LAYER

BACKGROUND

1. Field of the Invention

The invention relates to network communication. More specifically, the invention relates to secure communication between network devices without the use of secure socket layer.

2. Background

With the proliferation of the internet, the need and desirability of managing devices over a distributed network in a secure manner continues to increase. Typical web browsers support Java, Java Script, frames and forms. However, the contents of such frames, forms, and even the Java Script passed between a web browser and a web server is typically freely visible to potential third parties snooping the web traffic. To ensure proper management and to avoid intentional and unintentional acquisition of sensitive data by third parties, the exchange between a browser and a device under management, should be secure, e.g., both authenticated and encrypted.

To permit secure communication between network nodes, Secure Socket Layer ("SSL") was developed by Netscape Communications Corporation as a protocol to permit encrypted communications. SSL is layered under Hypertext Transfer Protocol ("HTTP") and Above Transmission Control Protocol/Internet Protocol ("TCP/IP"). SSL is used by HTTPS as access methods. Unfortunately, SSL requires third party authentication, embedded certificates and exchange of certificates when the host name is changed. For these and other reasons, it is not suitable for management of embedded network appliances or certain other environments in which secure communication is desirable.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1 is a block diagram of the system of one embodiment of the invention.

FIG. 2a is a schematic diagram of the frames sent from a Device Under Management in one embodiment of the invention.

FIG. 2b is a schematic diagram representative of a layout for a concatenated string for one embodiment of the invention after decryption.

DETAILED DESCRIPTION

Figure 3:
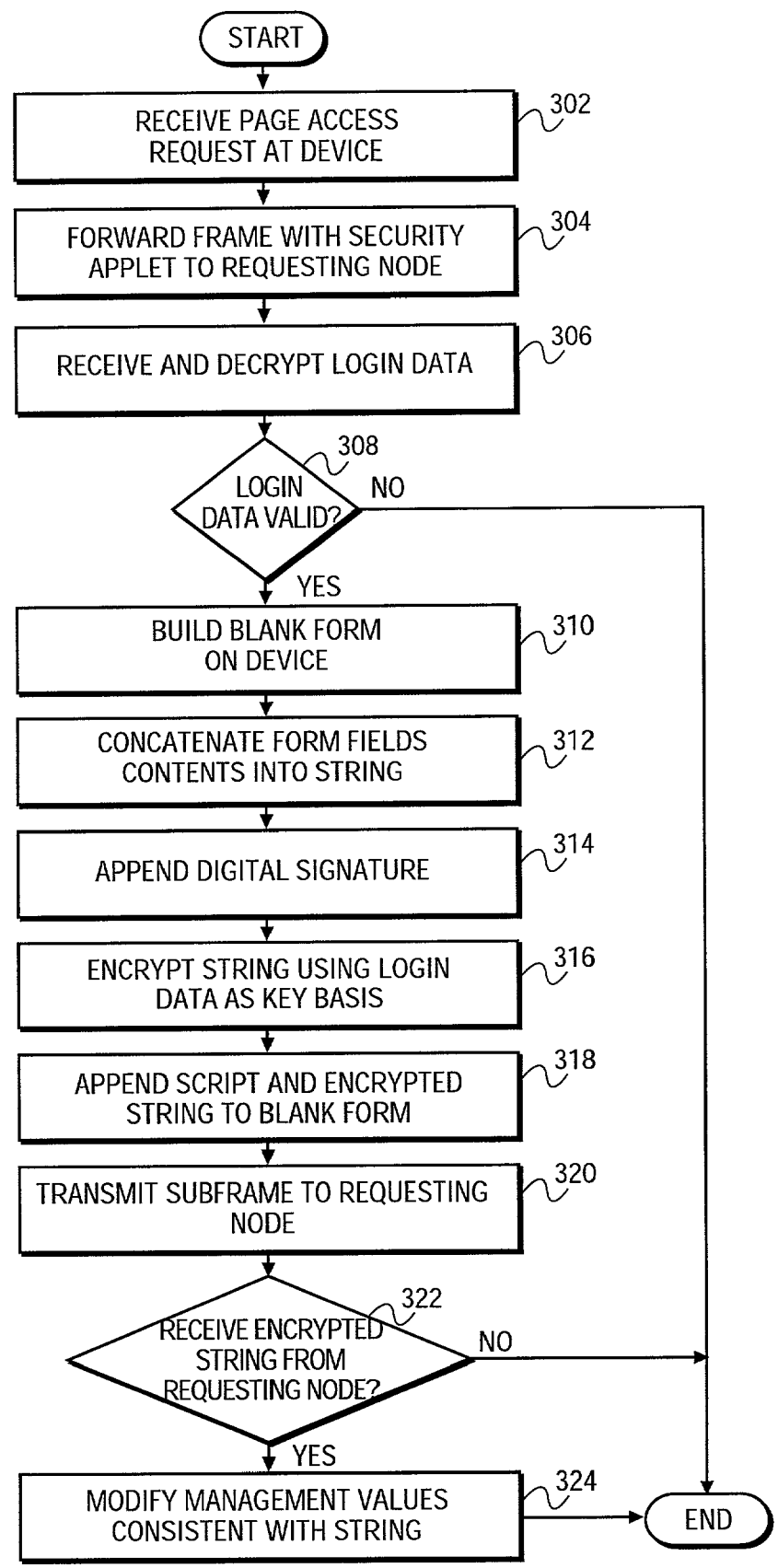
FIG. 3 is flow diagram of operation on the Device Under Management in one embodiment of the invention.

FIG. 1 is a block diagram of the system of one embodiment of the invention. A Device Under Management ("DUM") 100 is coupled to a distributed network such as internet 102. External node 104 is also coupled to internet 102. External node 104 may be used to manage DUM 100 over the internet 102. There may be an arbitrarily large number of DUM's coupled with the internet 102 up to $DUM_N$ 108 with each device manageable by external node 104.

In one embodiment, external node 104 may be any internet access device that supports Java, Java Script, frames and forms. In one embodiment, external node 104 may be a personal computer (PC) executing a web browser such as Microsoft Explorer® or Netscape Navigator®. As previously noted, such browsers support Java, Java Script, frames and forms. DUM 100 may be any network element including an embedded network appliance, such as the Interjak™ 200 available from Filanet Corporation of Sunnyvale, Calif. DUM 100 may provide web server functions, or for example, a fire wall for clients 106.

When external node 104 first requests secure access to DUM 100, such as, for example, management access, device 100 serves a frame containing an embedded security applet to external node 104. In one embodiment, the security applet is a Java applet. In another embodiment, the security applet may be realized using embedded Java Script code. The security applet generates a login window on the external node 104. A user can then enter their required login data to gain access to the DUM 100. As used herein, "login data" may include a user I.D., a password, or both. The security applet encrypts the login data and sends the encryption login data over the internet 102 to DUM 100. In one embodiment, the login data is encrypted with a random key generated in DUM 100 and sent to the external node as part of the Java Script code within the login page. DUM 100 decrypts the login data and determines if the login data is valid. If the login data is valid, it is used as a basis for a key for all subsequent encryption. As used herein to serve "as a basis for the key" is deemed to include, without limitation, direct usage as the key, usage of all or part of the login data as a seed for a pseudo random number generator to generate a pseudo random key, and indirect use, such as using the login data to encrypt a known data set and using the encrypted known data set as the key for subsequent encryption or using a hash of the login data as the key. When the login data is used directly, longer login data will yield stronger encryption.

Subsequent pages are provided to the external node 104 as subframes of the frame containing the security applet. Such subframes include the form having blank fields, a concatenated string of the field values with a digital signature all separated by appropriate delimiters and encrypted using the login data based key, and a script to decode and distribute the string. In one embodiment, the script is a Java Script. In one embodiment, 3DES (3 Data Encryption Standard) encoding is used. In one embodiment, the encoded string is transferred into the Java Script section of the web page together with a Java Script to decode the string and distribute it to the fields appropriately. If the user modifies the fields at the external node 104, the script provided as part of the page will concatenate at least the modified fields, digitally sign and encrypt the concatenated string. In one embodiment, only the modified fields are concatenated. In an alternative embodiment, all field values are concatenated if any field is modified. In one embodiment, the Java Script hooks into the security applet which performs the heavy lifting of the encrypting and signing function.

FIG. 2a is a schematic diagram of the frames sent from a Device Under Management in one embodiment of the invention. Parent frame 200, which has resident security applet (not shown), remains active on the external node for the entire secure session. As explained below, by retaining login data and using that data as a key basis for encryption and decryption, secure communication can be accomplished without third party authentication, embedded certifications, and change in certificate as the host name changes or other short comings of Secure Socket Layer ("SSL"). A subframe 202 includes blank form 212, which has blank fields 204, 206 and 208 as well as text or other static information 210. In one embodiment, the static information 210 is not encrypted and is readily discernable from the source code for the frame. In another embodiment, static text such as status information is also encrypted either as part of a single concatenated string or as separate strings. A submit button 214 may also be provided to permit the user to indicate that modifications to the fields should be sent back to the DUM.

FIG. 2b is a schematic diagram representative of a layout for a concatenated string for one embodiment of the invention after decryption. A type and data length field delimits the data to be inserted in the plurality of blank fields. In this example, the content for field 204 ("204") is a four byte integer value, 206' is a sixty-four byte character value and 208' is a single byte Boolean value. Other ways of delimiting the field contents are within the scope and contemplation of the invention.

FIG. 3 is flow diagram of operation on the Device Under Management in one embodiment of the invention. At functional block 302, the device receives a page access request that would be subject to secure access requirements. At functional block 304, the device forwards a frame with an embedded security applet to the requesting node. At functional block 306, the device receives and decrypts login data from the requesting node. The determination is made at decision block 308 whether the login data is valid. If the login data is not valid, access is denied and no page is sent.

If the login data is valid, the device builds a blank form at functional block 310. The field values for the form evident from the source code are "empty." Meanwhile, the field contents for which security is desired are concatenated into a string at functional block 312. At functional block 314, a digital signature is appended to the string. In one embodiment, the digital signature is acquired by forming a one-way hash of the string of concatenated field contents. The aggregate string, including the digital signature, is encrypted at functional block 316 using the login data as the key basis. A script, such as an appropriate Java Script, which may be tailor made for each page and the encrypted string may be appended to the blank form at functional block 318. The subframe including the blank form, the encrypted string, and the script is transmitted to their requesting node at functional block 320.

A determination is made at 322 whether a subsequent encrypted string is received from the requesting node at decision block 322. If such subsequent string is received, the DUM decrypts the string and modifies its management values consistent with the values contained in the string at functional block 324. If no subsequent encrypted string is received, no further action is taken by the DUM, unless a further secure request is received, in which case a DUM continues executing from functional block 310 to provide the next requested form.

Figure 4:
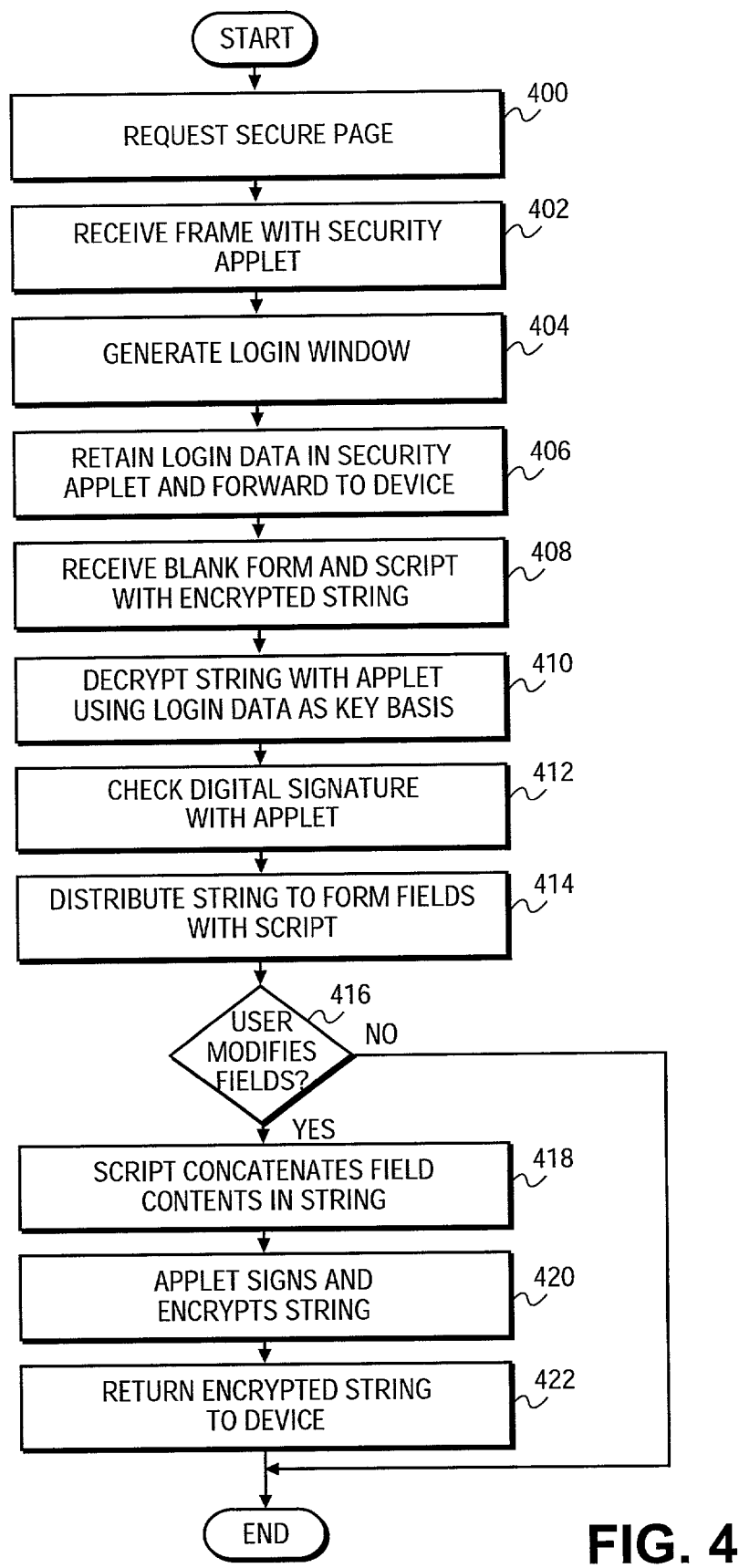
FIG. 4 is a flow diagram of operation on external node in one embodiment of the invention.

FIG. 4 is a flow diagram of operation on external node in one embodiment of the invention. At functional block 400, the external node requests a secure page from a network element, such as DUM 100 (referring to FIG. 1). At functional block 402, the external node receives a frame with an embedded security applet. The security applet within the received frame generates a login window at functional block 404. Login data entered by the user is retained by the security applet and forwarded to the device at functional block 406. In one embodiment, the login data is encrypted by the security applet prior to being forwarded to the device. In another embodiment, the login data is hashed prior to encryption and the hash value is encrypted with the login data and forwarded to the device. At functional block 408, the external node receives a frame including a blank form (e.g., a form having blank fields), a script, and an encrypted string. In one embodiment, the script is a Java Script. At functional block 410, the script activates the security applet to decrypt the string using the previously retained login data as the key basis. At functional block 412, the script uses the applet to check the digital signature appended to the string. At functional block 414, the script distributes the string to the fields of the form. In one embodiment, the script parses the string based on delimiting fields denoting data length and data type.

At decision block 416, a determination is made whether the user has modified any fields of the form that should be submitted back to the device. In one embodiment, the determination is based on a submit event, such as actuation of a submit button within the subframe. If the user has modified the fields of the script within the subframe concatenates the field contents into a string at functional block 418. The script then causes the applet to sign and encrypt the string (using the login data based key) at functional block 420. At functional block 422, the encrypted string is returned to the device.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   concatenating data for a plurality of fields of a requested web page into a string;
   encrypting the string;
   serving to a user node, the web page and a form corresponding to the requested web page that includes a blank field in each of the plurality of fields and the encrypted string; and
   enabling at least the encrypted string to be locally decrypted and distributed into each respective blank field to allow interacting with the decrypted string at the user node.

2. The method of claim 1 further comprising:
   appending a digital signature to the string prior to encryption.

3. The method of claim 1 further comprising:
   inserting the string and a script into a defined portion of the web page to be served.

4. The method of claim 3 wherein the defined portion is a locally executed script section of the web page.

5. The method of claim 1 further comprising:
   serving a script within the web page, the script to decrypt the string and apportion the string to the blank fields.

6. The method of claim 1 further comprising:
   serving a security applet to the user node; and
   receiving login data from the user node encrypted by the security applet.

7. The method of claim 6 wherein the login data forms a basis for a key used to encrypt the string.

8. The method of claim 6 wherein the security applet is a locally executed applet to perform decryption of the string subsequently sent using a key word from the login data.

9. The method of claim 6 further comprising:
comparing the login data to a valid login data to identify if the user is valid; and
denying access if the user node is not valid.

10. An internet access device having executable instructions that when executed, perform actions comprising:
accepting a frame having a resident security applet;
receiving a subframe including a form with a plurality of blank fields;
receiving an encrypted string of concatenated data;
locally decrypting the encrypted string with the security applet; and
distributing a plurality of portions of the decrypted string to the plurality of blank fields in the form.

11. The internet access device of claim 10 wherein distributing comprises:
parsing the string delimited by embedded length and data type.

12. The internet access device of claim 10 further comprising:
accepting user modification of a field in the form;
concatenating data into a string from at least one of the plurality of fields, including at least a content of the field modified;
encrypting the string using the security applet; and
transmitting the string to a remote node.

13. The internet access device of claim 10 further comprising:
deriving a key from login data supplied by a user.

14. The internet access device of claim 12 wherein an encryption key is based on login data received from a user.

15. The internet access device of claim 10 further comprising:
generating a login window within the frame;
receiving login data from a user; and
receiving the login data in the security applet.

16. A computer readable storage media containing executable computer program instructions which when executed cause a digital processing system to perform a method comprising:
concatenating data for a plurality of fields of a requested web page into a string;
encrypting the string;
serving to a user node, the web page and a form corresponding to the requested web page that includes a blank field in each of the plurality of fields and the encrypted string; and
enabling at least the encrypted string to be locally decrypted and distributed into each respective blank field at the user node.

17. The computer readable storage media of claim 16 which when executed cause a digital processing system to perform a method further comprising:
appending a digital signature to the string prior to encryption.

18. The computer readable storage media of claim 16 which when executed cause a digital processing system to perform a method further comprising:
inserting the string and a script into a defined portion of the web page to be served.

19. The computer readable storage media of claim 18 which when executed cause a digital processing system to perform a method further comprising:
the defined portion is a locally executed script section of the web page.

20. The computer readable storage media of claim 16 which when executed cause a digital processing system to perform a method further comprising:
serving a script within the web page, the script to decrypt the string and apportion the string to the blank fields.

21. The computer readable storage media of claim 16 which when executed cause a digital processing system to perform a method further comprising:
serving a security applet to the user node; and
receiving login data from the user node encrypted by the security applet.

22. The computer readable storage media of claim 21 the login data forms a basis for a key used to encrypt the string.

23. The computer readable storage media of claim 21 wherein the security applet is a locally executed applet to perform decryption of the string subsequently sent using a key word from the login data.

24. The computer readable storage media of claim 21 which when executed cause a digital processing system to perform a method further comprising:
comparing the login data to a valid login data to identify if the user is valid; and
denying access if the user node is not valid.

* * * * *

UNITED STATES PATENT AND TRADEMARK OFFICE
CERTIFICATE OF CORRECTION

PATENT NO. : 7,296,145 B1 Page 1 of 1
APPLICATION NO. : 09/853743
DATED : November 13, 2007
INVENTOR(S) : Storm It is certified that error appears in the above-identified patent and that said Letters Patent is hereby corrected as shown below:

In column 2, line 11, delete "Interjak™" and insert -- InterJack™ --, therefor.

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,296,145 B1 | Page 1 of 1 |
| APPLICATION NO. | : 09/853743 | |
| DATED | : November 13, 2007 | |
| INVENTOR(S) | : Storm | |

It is certified that error appears in the above-identified patent and that said Letters Patent is hereby corrected as shown below:

In column 6, line 35, in Claim 22, after "claim 21" insert -- wherein --.

Signed and Sealed this

Thirty-first Day of August, 2010

David J. Kappos
*Director of the United States Patent and Trademark Office*